United States Patent
Pan et al.

(10) Patent No.: US 11,745,138 B2
(45) Date of Patent: *Sep. 5, 2023

(54) HEALTH MANAGEMENT OF MEMBRANE GAS SEPARATION SYSTEMS

(71) Applicant: Schlumberger Technology Corporation, Sugar Land, TX (US)

(72) Inventors: Shu Pan, Sugar Land, TX (US); Oleg O. Medvedev, Missouri City, TX (US); Jose R. Celaya Galvan, Sunnyvale, CA (US); George E. Mahley, III, Berkeley, CA (US); Atsushi Morisato, Walnut Creek, CA (US); Jason M. Dietrich, Walnut Creek, CA (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 17/262,932

(22) PCT Filed: Jul. 29, 2019

(86) PCT No.: PCT/US2019/043886
§ 371 (c)(1),
(2) Date: Jan. 25, 2021

(87) PCT Pub. No.: WO2020/023955
PCT Pub. Date: Jan. 30, 2020

(65) Prior Publication Data
US 2021/0138394 A1    May 13, 2021

Related U.S. Application Data

(60) Provisional application No. 62/711,187, filed on Jul. 27, 2018.

(51) Int. Cl.
*B01D 53/22* (2006.01)
*B01D 53/30* (2006.01)

(52) U.S. Cl.
CPC .......... *B01D 53/228* (2013.01); *B01D 53/30* (2013.01); *B01D 2256/24* (2013.01); *B01D 2257/304* (2013.01)

(58) Field of Classification Search
None
See application file for complete search history.

(56) References Cited

U.S. PATENT DOCUMENTS

| | | | |
|---|---|---|---|
| 2011/0035195 A1 | 2/2011 | Subbiah et al. | |
| 2016/0214732 A1* | 7/2016 | Vigliotta | B01D 53/30 |

(Continued)

FOREIGN PATENT DOCUMENTS

| | | |
|---|---|---|
| CN | 105152317 A | 12/2015 |
| WO | 2015161968 A1 | 10/2015 |
| WO | 2016122067 A1 | 8/2016 |

OTHER PUBLICATIONS

N.J. Gordon, D.J. Salmond and A.F.M. Smith, Novel approach to non-linear/non-Gaussian Bayesian state estimation, IEE Proceedings-F, vol. 140, No. 2, Apr. 1993 (7 pages).

(Continued)

*Primary Examiner* — Jason M Greene

(57) ABSTRACT

Bayesian recursive estimation is used to analyze performance parameters of a membrane separation system based on historical operational data of a membrane system. Bayesian estimation considers historical data over prior time intervals to predict future membrane separation performance to avoid unexpected downtime and unanticipated maintenance. A set of state variables used for modeling performance is used with a degradation model of to anticipate (Continued)

performance changes and maintenance based on measured properties of permeate, non-permeate, and feed flows.

13 Claims, 3 Drawing Sheets

(56) References Cited

U.S. PATENT DOCUMENTS

2017/0014774 A1* 1/2017 Daniello ............... B01D 53/30
2020/0164307 A1* 5/2020 Claris .................. B01D 53/30
2021/0308621 A1 10/2021 Pan et al.

OTHER PUBLICATIONS

International Search Report and Written Opinion issued in the PCT Application PCT/US2019/043886, dated Nov. 11, 2019 (9 pages).
David, Oana Christina et al., Mixed gas separation study for the hydrogen recovery from H2/CO/N2/CO2 post combustion mixtures using a Matrimid membrane, Journal of Membrane Science, 2011, vol. 378, pp. 359-368.
Ribeiro Jr., Caludio P. et al., Pure-and mixed-gas carbon dioxide/ethane permeability and diffusivity in a cross-linked poly (ethylene oxide) copolymer, Journal of Membrane Science, 2011, vol. 377, pp. 110-123.
Chen, Junjie et al., Computational fluid dynamics modeling of the millisecond methane steam reforming in microchannel reactors for hydrogen production, RSC Advances, Jul. 16, 2018, vol. 8, pp. 25183-25200.
Xia, Jianzhong et al., Physical aging and carbon dioxide plasticization of thin polyimide films in mixed gas permeation, Journal of Membrane Science, 2014, vol. 450, pp. 457-468.
Muller, Nils et al., Physical ageing and lifetime prediction of polymer membranes for gas separation processes, Journal of Membrane Science, 2016, vol. 516, pp. 33-46.
International Search report and written opinion issued in the PCT Application PCT/US2019/043899, dated Nov. 11, 2019 (9 pages).
International Preliminary Report on Patentability issued in the PCT Application PCT/US2019/043886, dated Feb. 11, 2021 (6 pages).
International Preliminary Report on Patentability issued in the PCT Application PCT/US2019/043899, dated Feb. 11, 2021 (6 pages).

* cited by examiner

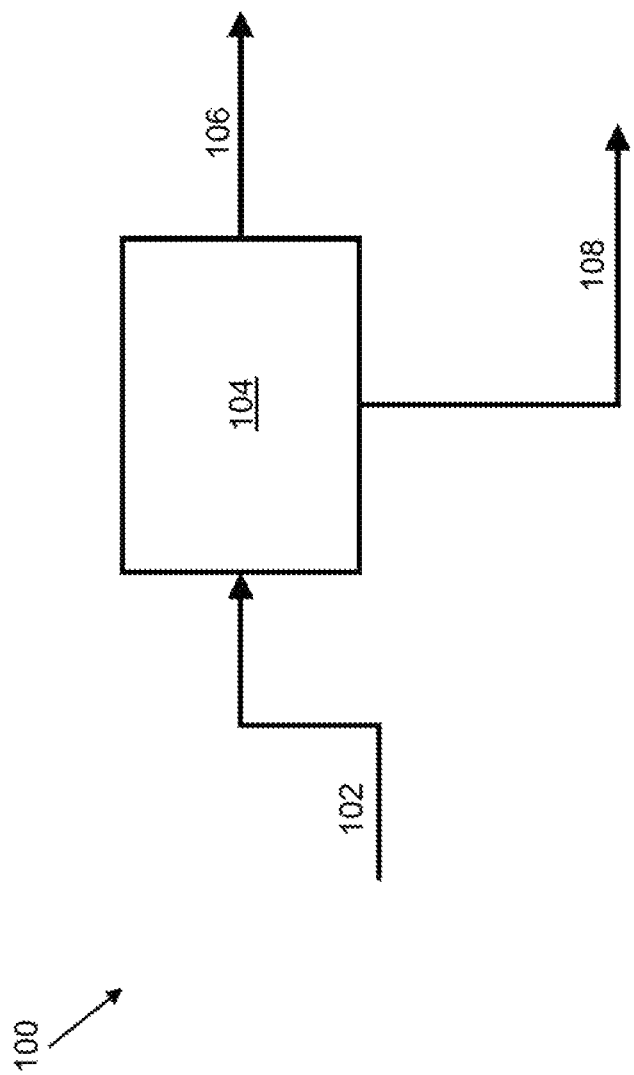

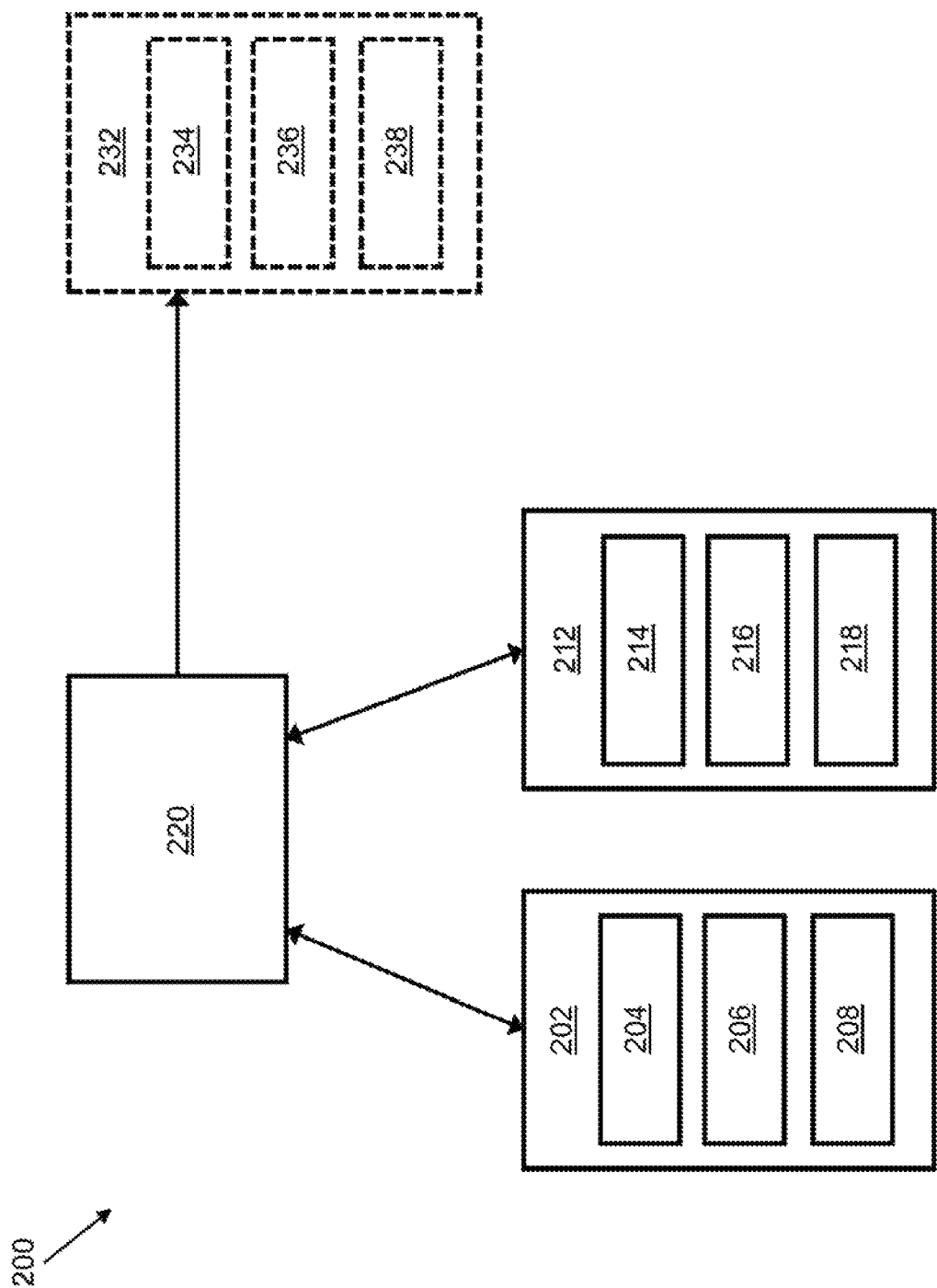

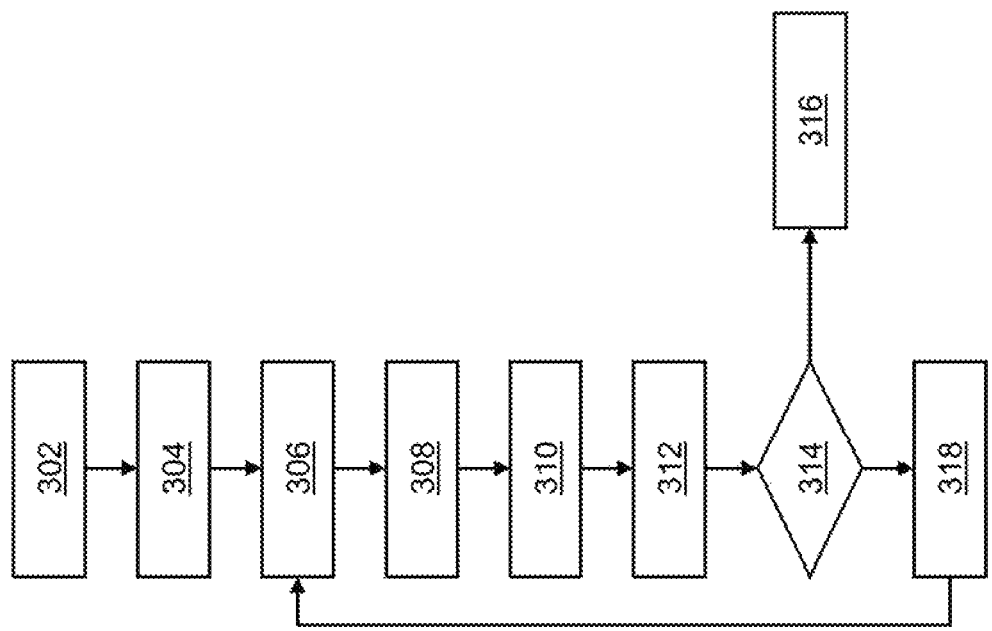

US 11,745,138 B2

HEALTH MANAGEMENT OF MEMBRANE GAS SEPARATION SYSTEMS

CROSS-REFERENCE TO RELATED APPLICATIONS

This application claims benefit of U.S. Provisional Patent Application Ser. No. 62/711,187 filed Jul. 27, 2018, the entirety of which is incorporated by reference herein.

BACKGROUND

Membrane-based gas separation systems include membranes that undergo performance changes as the membranes age. Membrane performance changes due to physical changes in the membrane, including plasticization, physical changes, and mechanical strains applied to the membrane.

Management of membrane performance in membrane gas separation systems involves analysis of current membrane performance to estimate future performance and operating costs, and to avoid an anticipated system downtime due to failure of a membrane gas separator. There is a need for accurate methods of determining the status of a membrane to avoid unplanned outages due to membrane failure.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a schematic diagram of a membrane gas separation system, in accordance with some embodiments.

FIG. 2 is a schematic diagram of a membrane control system, in accordance with some embodiments.

FIG. 3 is a schematic diagram of a performance curve of a membrane in a membrane-based gas separation system, according to some embodiments.

DETAILED DESCRIPTION

The following disclosure provides many different embodiments, or examples, for implementing different features of the provided subject matter. Specific examples of components, values, operations, materials, arrangements, etc., are described below to simplify the present disclosure and are not intended to be limiting. Other components, values, operations, materials, arrangements, etc., are contemplated. In addition, the present disclosure may repeat reference numerals and/or letters in the various examples. This repetition is for the purpose of simplicity and clarity and does not in itself dictate a relationship between the various embodiments and/or configurations discussed.

Membrane technology has been widely used in a variety of industrial sectors in order to achieve efficient, low-energy separation of components in a feed stream applied to a membrane. Membrane technology has been adapted in gas separation applications in the oil and hydrocarbon extraction industry. Performance of membrane separation systems is prone to sudden failure as membranes exceed their remaining useful lifetime. Membrane separation is also subject to long-term evolution due to aging characteristics of the membranes after exposure to elevated temperatures, pressures, or other stressors.

Sudden damage to membranes is usually related to unanticipated events in operating membrane separation systems, although long-term change in the membrane also contributes to unanticipated failures. Long-term degradation of membranes is related to manufacturing quality of individual membranes and operating conditions of facilities that employ membrane-based separation systems. There can be a wide degree of variability in the quality of membranes used in membrane separation systems related to characteristics of membrane manufacturing processes that are difficult to control. Thus, accurately predicting the lifetime of a membrane in a separation system is nontrivial. The present disclosure presents a method of analyzing membrane performance in the context of a membrane status monitoring system to promote timely maintenance and intervention with membrane separation systems to avoid unanticipated failures and the associated costs to a manufacturing process that rely on said membrane separation systems.

In the present disclosure, a membrane status monitoring and membrane control system is described that collects and aggregates real-time operational data from membrane separation systems at separation plants. The collected, aggregated data is used to update models associated with membrane performance at a current interval, as well as membrane performance in the future. The models are used to estimate membrane status, which in turn is used to control the membrane separation process. The models can be used across an entire gas processing facility to improve operational efficiency. The models can also be used to improve designs of gas separation plants and safety margins in the plant designs according to the plant operational characteristics.

FIG. 1 is a schematic diagram of a membrane separation system 100. A flow of incoming material, or a feed stream, is admitted through an inlet line 102 into membrane unit 104. In some instances, a flow of incoming material is a gaseous flow. In some instances, a flow of incoming material is a liquid flow. In some instances, a flow of material is a flow of supercritical material. Membrane unit 104 includes at least one membrane for performing a separation process on the components of the incoming material flow, and incudes at least one membrane, a membrane fastening means, and a plurality of sensors configured within the membrane unit to detect a condition of the membrane, of the flow of incoming material, or of a flow of material after exposure to the membrane (permeate and non-permeate flows). The flow of incoming material entering the membrane unit 104, is split into a permeate flow that travels through outlet line 106, and a non-permeate flow that travels through outlet line 108. The permeate flow that travels through outlet line 106 is a flow of material that has passed through, or permeated, the membrane in membrane unit 104. The non-permeate flow is material that, having entered the membrane unit 104, is forced out of the membrane unit 104 without having passed through the membrane. The pressure of the incoming material contributes to the formation of the permeate flow in outlet line 106 by applying a physical force on the membrane, keeping a supply of mixed inlet material in contact with the membrane, and promoting e.g., a chemical binding process, physical adhesion process, capillary process, or other physical or chemical process associated with separating materials into separated flows using a membrane.

In some embodiments, the feed stream or the flow of incoming material is a mixture of gaseous components. In some embodiments, the feed stream is at an elevated pressure and or elevated temperature in order to promote separation of components of the gaseous mixture by a membrane in a membrane separation system. In some embodiments, the gaseous components include one or more of carbon dioxide, methane, ethane, propane, butane, isobutane, or other saturated hydrocarbons—for example, a wellhead natural gas stream. In some embodiments, the gaseous components include unsaturated hydrocarbons such as ethene, propene, one or more butene isomers, one or more pentene isomers, and so forth. In some embodiments, one or more of the gaseous components includes mixtures of inorganic molecules such as ammonia, hydrogen sulfide, hydrogen cyanide, carbon monoxide, carbon dioxide, hydrogen sulfide, and so forth. Gas separation systems using membrane technology are discussed herein, however the scope of the present disclosure relating to a system for monitoring health of membrane-based separation units is envisioned to cover other applications beyond gas separation, including liquid separation systems, water purification, and or mining and resource extraction applications that employ membrane-based separation technology.

FIG. 2 is a schematic diagram of a membrane health monitoring system 200, according to some embodiments. Membrane health monitoring system 200 includes membrane separation plants 202 and 212. Each membrane separation plant includes a plurality of membrane separation systems, 204, 206, 208, and 214, 216, and 218. Membrane separation systems disclosed herein receive an inlet stream or feed, as described with regards to FIG. 1 at a membrane separation unit similar to membrane separation unit 104, which produces 2 outlets: a permeate stream or permeate flow, and a non-permeate stream or non-permeate flow. Permeate stream from a membrane separation unit includes one or more fractions of the inlet stream or feed that selectively pass through a membrane in membrane separation unit 104 to a permeate outlet line such as outlet line 106. A remainder of the inlet stream or feed is directed towards non-permeate stream conducted in a non-permeate outlet line such as outlet line 108.

Information conveyed between membrane separation plants 202 and 212 and a computing resource 220 includes measurements of real-time operating characteristics of the separation plants, status of plant operations parameters, and so forth. In some instances, the computing resource 220 is a server or server cluster located in a single plant that analyzes and coordinates the performance of membrane separation units in the single plant. In some instances, the computing resource 220 is a server or server cluster, or other computational resource that is separate from a membrane separation plant and receives data from, and coordinates operation parameters of, the one or more membrane separation plants communicatively connected to the computing resource. The computing resource includes storage media, processors, random access memory (RAM), networking equipment, and so forth, to perform the computations involved with monitoring, recording, and modifying operational parameters of membrane separation plants and the individual membrane separation units located therein. In some instances, the computing resource 220 is a cloud-storage resource with commercially available computing hardware storing and implementing instructions stored on storage media thereof, or communicated to the cloud-storage resource by a computing resource at a membrane separation plant. Further discussion of the computing resource is provided below.

Each membrane separation system, or membrane separation unit, in a membrane separation plant delivers data regarding variables flowrate Q, temperature T, pressure P and compositions $C_i$ (the index number i identifies different components in the stream exiting a membrane separator) in each stream to allow the non-destructive monitoring of membrane conditions. These variables can be classified into two categories. The first category is feedstock and control variables $\overline{X}$. These parameters are determined before membrane gas separation, and typically include flowrate, temperature, pressure in a line (e.g., inlet pressure), partial pressure of gaseous components in a line, chemical composition of the inlet flow or feed stream, and so forth. These parameters also include other non-process-defined operational parameters, such as the membrane maintenance or replacement schedule, profile of operators or technicians, supervising the operations, as well as the history of past conditions, the history of specific membrane unit, etc. The second category is outlet variables $\overline{Y}$. These parameters represent the results of membrane gas separation, such as pressure of outlet lines (e.g., permeate line pressure, and non-permeate line pressure), flow rates of permeate and non-permeate fractions through outlet lines, chemical composition of the permeate and non-permeate fractions in the outlet lines, and so forth.

Modeling of individual membrane performance includes collecting, storing, transmitting, and analyzing data regarding membrane characteristic parameters $\overline{M}$ including membrane areas S, pressure normalized fluxes of each component $P_i$, and so forth. Said data is communicated between membrane separation plants and computing resource 220 in order to promote accurate modeling and control of individual membranes in membrane separation units. When modeling individual membrane performance, and given $\overline{X}$ and $\overline{M}$, one obtains $\overline{Y}$ through a membrane separation model F, given below in Equation 1:

$$\overline{Y}=F(\overline{X},\overline{M}) \qquad \text{(Equation 1)}$$

And reversely, one may obtain membrane characteristics $\overline{M}$ from $\overline{X}$ and $\overline{Y}$ by the relationship described in Equation 2:

$$\overline{M}=F^{-1}(\overline{X},\overline{Y}) \qquad \text{(Equation 2)}$$

Equation 2 provides a mathematical foundation to monitor membrane condition through the measurement of feed, perm and non-perm streams.

Variation in performance of the membrane unit is represented by the variation of $\overline{M}$, particularly fluxes $P_i$ of each component, with time. The modelling and forecast of these variations will lead to an estimation of the future state of the membrane, giving an ability to control the membrane process based on the predicted future state. Aggregate data, including the individual membrane data, models, and estimations of EOL and RUL, are transmitted to the computing resource 220 for aggregate membrane simulation models employing a Bayesian recursive estimation.

Bayesian recursive estimation in simulation models is continuously updated when a Markov process is assumed. In a Markov process, the new data is incorporated into the models upon arrival, and updates of models do not depend on reprocessing of historical operational performance data, reducing a total computational load incurred by computing resource 220 during operation and modeling of plant performance characteristics. Periodic or occasional instructions are transmitted from computing resource 220 to additional computing resources and/or control systems of individual membrane separation plants (or, individual membrane separations systems) to regulate current, or ongoing, plant operations. Models of plant operations, membrane performance, and predicted rates of membrane evolution are transmitted between computing resource 220 and control systems or resources of operating membrane separation plants 202, 212.

Further, models of plant operations, membrane performance, and predicted rates of membrane evolution are transmitted between computing resource 220 and control systems or computing resources at new, offline, or previously unmodeled separation plants, to anticipate plant operation patterns and productivity and/or output, to reduce operational costs and anticipate plant maintenance and performance setpoints.

An overview of the Bayesian recursive approach for membrane based gas separation system data processing is described below. Two relationships that are used with the Bayesian approach are the state, and the observation equations. The state equation is provided below in Equation 3:

$$X(t+\Delta t) = f(X(t), v) \qquad \text{(Equation 3)}$$

In Equation 3, $X(t)$ is a vector of state random variables at time t. Function $f$ is the state transit function describing how $X(t)$ changes with t, and $v$ is identically independently distributed process noises, similar to the parameters of membrane simulation models. In some embodiments of the method, state variables have physical meanings. In some instances, the state variables do not have physical meaning. State variables with physical meanings can include solubility and diffusivities of a gas molecule in a membrane, although other physical parameters are also within the scope of the present disclosure. Equation (3) gives the probabilistic distribution P of $X(t+\Delta t)$ based on $X(t)$, namely $P(X(t+\Delta t)|X(t))$.

The measurement equation is given by equation 4, below $$Z(t) = H(X(t), w) \qquad \text{(Equation 4)}$$

where $Z(t)$ is a vector of measurements of random variables representing the observations corresponding to the state vector at time t. The observation function H relates the state vector to the measurement vector. In a non-limiting example, for a typical membrane system, $Z(t)$ includes at least the flow rate, chemical compositions, and temperatures of the feed, permeate stream, and non-permeate stream, and w is the identically independently distributed measurement noise associated with the measurements of flow rate, chemical compositions, and temperatures. Equation 4 gives the probabilistic distribution of $Z(t)$ conditioned on $X(t)$, namely $P(X(Z(t)|X(t))$.

When performing Bayesian recursion procedures on a data stream related to the operational state of membranes and a membrane separation plant, the recursion is simplified by assuming discrete time intervals for data. Measurements are assigned to measurement time intervals, and predictions are assigned to future time intervals when the recursion is taking place. For a set of time intervals 1, 2, 3, ... k, $X_k$ and $Z_k$ are the state and measurement values associated with an interval k. The following operations are associated with a method of updating performance models and making predictions based on the updated models.

FIG. 3 is a flow diagram of a method 300 of updating performance models and making predictions based on the updated models, according to an embodiment. In a first operation 302, an initial probabilistic state $P(X_0) = P(X_0|Z_0)$ is determined based on prior knowledge or data about a state of, e.g., one or more membrane separation systems in a membrane separation plant. The data and/or prior knowledge includes, in some embodiments, real time data streamed from a membrane separation system and recorded by a computing resource such as computing resource 220, or a control system stored in a membrane separation plant. In some embodiments, the data and/or prior knowledge is from a same system that is being analyzed and for which predictions are being made. In some embodiments, the data and/or prior knowledge is derived from a similar, operational system, and applied to modeling for a new, non-operational system prior to operation. In some cases, the data is membrane characteristic data from a membrane manufacturer.

In an operation 304, a stream of real-time data is collected from a membrane separation system. In an operation 306, $X_k$ is determined according to data collected at a time interval between the k and the initial time interval 0. $X_k$ is determined according to prior data collected in operation 304 and the probabilistic distribution $$P(X_k|Z_{k-1}) = \int P(X_k|X_{k-1}) P(X_{k-1}|Z_{0:k-1}) dX_{k-1} \qquad \text{Equation (5)}.$$

Based on the value of the probabilistic distribution at time k, the predicted value of $Z_k$ is also obtained from $P(Z_k|X_k)$ as in Equation (4). Operations 304 and 306 are performed with information from previous steps $P(X_{k-1}|Z_{0:k-1})$ as prior knowledge, where $Z_{0:k-1}$ represents the knowledge of measurements made from $t=0$ and $t=k-1$.

In an operation 308, membrane performance is determined based on the prediction determined in operation 308, and updated operational models and/or control set points are transmitted from a computing resource to the membrane separation plants.

In an operation 310, additional real-time data is collected from membrane separation systems at various membrane separation plants. In an operation 312, based on the additional real time data collected in operation 310, a model of the membrane system performance is updated according to embodiments disclosed herein.

In an embodiment, $X_k$ is updated as follows, where:

$$P(X_k|Z_{0:k}) = P(X_k|Z_k, X_{0:k-1}) \qquad \text{Equation (6)}$$

$$P(X_k|Z_{0:k}) = \frac{P(Z_k|X_k, Z_{0:k-1}) P(X_k|Z_{0:k-1})}{P(Z_k|Z_{0:k-1})} \qquad \text{Equation (7)}$$

$$P(X_k|Z_{0:k}) = \frac{P(Z_k|X_k, Z_{0:k-1}) P(X_k|Z_{0:k-1})}{\int (Z_k|X_k) P(X_k|Z_{0:k-1})} \qquad \text{Equation (8)}$$

In an operation 314, a determination is made about whether to continue the system modeling and development. When a determination is made to continue, the time is incremented to a new interval k+1 in operation 318, and the method continues to operation 306. When the determination is made to halt operations, the operation proceeds to operation 320, where the data is saved and a new initialized state is determined as described above in operation 302.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A method, comprising:
providing a gas mixture to a membrane separator comprising a membrane;

separating the gas mixture into a first gas and a second gas using the membrane separator;
measuring a flow rate of the gas mixture, the first gas, and the second gas;
measuring a composition of the gas mixture, the first gas, and the second gas;
measuring a pressure of the gas mixture;
determining a thermodynamic state of the gas mixture from the measured pressure;
determining a current state of the membrane based on the flow rates and compositions, and the thermodynamic state, using a physical model;
predicting a future state of the membrane using a time-series model; and
adjusting the flow rate or thermodynamic state of the gas mixture based on the predicted future state.

2. The method of claim 1, further comprising comparing the current state of the membrane to a prior predicted state of the membrane and updating the time-series model based on the comparison.

3. The method of claim 1, further comprising comparing the predicted future state of the membrane to a standard.

4. The method of claim 1, wherein the time-series model is based on data from a plurality of membrane separators.

5. The method of claim 1, further comprising updating the time-series model by updating a probability distribution using a Bayesian recursive method.

6. A method, comprising:
providing a gas mixture to a membrane separator comprising a membrane;
separating the gas mixture into a first gas and a second gas using the membrane separator;
measuring a flow rate of the gas mixture, the first gas, and the second gas;
measuring a composition of the gas mixture, the first gas, and the second gas;
measuring a pressure of the gas mixture;
determining a thermodynamic state of the gas mixture from the measured pressure;
determining a current state of the membrane based on the flow rates and compositions, and the thermodynamic state, using a physical model;
predicting a future state of the membrane using a time-series model;
determining a probability distribution of the predicted future state;
adjusting the flow rate or thermodynamic state of the gas mixture based on the predicted future state; and
updating the time-series model based on the probability distribution of the predicted future state.

7. The method of claim 6, further comprising comparing the current state of the membrane to a prior predicted state of the membrane and updating the time-series model is also based on the comparison.

8. The method of claim 6, wherein the time-series model is based on data from a plurality of membrane separators.

9. The method of claim 6, further comprising comparing the predicted future state of the membrane to a standard.

10. A method, comprising:
providing a gas mixture to a membrane separator comprising a membrane;
separating the gas mixture into a first gas and a second gas using the membrane separator;
measuring a flow rate of the gas mixture, the first gas, and the second gas;
measuring a composition of the gas mixture, the first gas, and the second gas;
measuring a pressure of the gas mixture;
determining a thermodynamic state of the gas mixture from the measured pressure;
determining a current state of the membrane based on the flow rates and compositions, and the thermodynamic state, using a physical model;
predicting a future state of the membrane using a time-series model;
comparing the predicted future state of the membrane to a standard;
adjusting the membrane process based on the predicted future state and comparison of the predicted future state of the membrane to the standard;
determining a probability distribution of the predicted future state;
adjusting the flow rate or thermodynamic state of the gas mixture based on the predicted future state; and
updating the time-series model based on the probability distribution of the predicted future state.

11. The method of claim 10, further comprising comparing the current state of the membrane to a prior predicted state of the membrane and updating the time-series model is also based on the comparison.

12. The method of claim 10, wherein the time-series model is based on data from a plurality of membrane separators.

13. The method of claim 10, further comprising halting operation of the membrane separator based on the predicted future state of the membrane.

* * * * *